March 28, 1961 H. CHURCH Re. 24,954

APPARATUS FOR FILTERING SOLIDS FROM GAS-SOLIDS SUSPENSIONS

Original Filed July 26, 1951 3 Sheets-Sheet 1

INVENTOR.
HOWARD CHURCH
BY
James E. Toomey
Agt

March 28, 1961 H. CHURCH Re. 24,954

APPARATUS FOR FILTERING SOLIDS FROM GAS-SOLIDS SUSPENSIONS

Original Filed July 26, 1951 3 Sheets-Sheet 2

INVENTOR.
HOWARD CHURCH
BY James E. Toomey
Ag.

APPARATUS FOR FILTERING SOLIDS FROM GAS-SOLIDS SUSPENSIONS

Original Filed July 26, 1951 3 Sheets-Sheet 3

INVENTOR.
HOWARD CHURCH
BY James E. Toomey
Atty.

United States Patent Office

Re. 24,954
Reissued Mar. 28, 1961

24,954

APPARATUS FOR FILTERING SOLIDS FROM GAS-SOLIDS SUSPENSIONS

Howard Church, Los Gatos, Calif., assignor, by mesne assignments, to American-Marietta Company, Chicago, Ill., a corporation of Illinois Original No. 2,804,168, dated Aug. 27, 1957, Ser. No. 238,595, July 26, 1951. Application for reissue Oct. 9, 1958, Ser. No. 768,518

15 Claims. (Cl. 183—61)

Matter enclosed in heavy brackets [ ] appears in the original patent but forms no part of this reissue specification; matter printed in italics indicates the additions made by reissue.

This invention relates to a method and apparatus for filtering suspended solids from gases and vapors. It has particular relation to the method and means for removing finely divided solids from suspensions of the same in vapors and gases, and the method and means for purging the filter medium employed in filtration.

It is well known that in filtration operations, including those wherein solids are removed from gases and vapors in which they [are] are entrained, the filter medium becomes coated with solid particles with resultant decrease in efficiency or even stoppage of the filtration. Some of the particles lodge in the pores or gas passages of the filter medium, and the rest of them form a compact filter cake which rapidly builds up on the surface of the filter. If filtration is to continue, the pores and surface of the filter medium must be freed of these separated solids from time to time.

A method which is generally used for achieving this objective involves the use of a backwashing operation. In this operation, a portion of the gaseous filtrate or of a separate backwashing gas is forced back through the filter medium to blow the solid particles out of the pores of the filter and to dislodge the tightly-packed filter cake from the surface of the filter.

In the performance of this backwashing operation when employing gaseous filtrate as the backwashing medium, the flow of the gaseous feed suspension to the filter apparatus is controlled by the use of mechanical valves whereby flow thereof is shut off immediately before the filtrate is forced back through the filter. When a separate backwashing gas is used, the filtrate line leading from the filter is also shut off by mechanical valves just before the backwashing operation is started.

Although backwashing by these methods may effectively cleanse the filter, considerable difficulty is experienced in connection with the mechanical valves that are required to frequently open and close the feed line and the filtrate line. As the quantity of material to be filtered increases, the operation naturally becomes more complex and generally requires a greater number of valves. After extended use, the valves in the feed lines frequently begin to leak and are useless, due to the effects of dust erosion or dust deposition or both on the valve face and walls. When, in addition, the feed suspension contains reactive components, these valve difficulties are an even greater problem. Thus, in spite of the potential efficiency of the prior art backwashing operation, the actual efficiency is not great because it is often impossible to prevent leakage and maintain separations between the feed suspension, the filtrate, and the backwashing gas during the filtration and backwashing operations.

The filtration methods of the prior art, largely because of the valve difficulties pointed out above, cannot be used for high temperature filtrations especially, such as the filtration of suspended solids from vapors. The disadvantages are increased due to the greater erosion and more corrosive effects of materials handled in the high temperature operation. This is especially the case when the vapor is that of a substance having a very high boiling temperature, such as a vaporizable metal.

In the production of magnesium by the carbothermic reduction method, for example, it is necessary to refine the carbothermic magnesium dust which contains finely divided magnesium, magnesium oxide, carbon and minor impurities. An average chemical analysis of the condensed dust product from the carbothermic reduction process (as described, for instance, in Hansgirg, U. S. 1,884,993) shows about 50% Mg (or usually between 35% and 65%), about 19% carbon and about 31% inert materials, principally MgO. There are usually about 5% Mg as the carbides, traces of sodium metal, and small amounts of Ca, Al and Si carbides. All of these materials have ultimate particles sizes below the resolving power of the microscope, being less than one micron diameter. Electron microphotographs reveal agglomerates as large as several microns in diameter and ultimate particles in the neighborhood of 0.1 micron. In one method of refining such magnesium-containing dust, it is heated to vaporization temperatures in the presence of a stream of inert gas to produce a mixture of gas and magnesium vapor, containing in suspension the submicronic particles of magnesia, carbon and other non-volatilizable constituents. These particles form quite stable suspensions and separation by settling is not a practicable operation. It has been proposed to recover the magnesium by fractional condensation or liquefaction of the metal from such suspensions, but contamination is appreciable. It is desired to filter off the contaminants at the high temperatures necessary to maintain the magnesium (or other metal) in the vapor phase. Obviously at these temperatures and rapid rates of flow of the gases, vapors, and solids, coupled with the inherent erosive and corrosive nature of such materials, mechanical valves especially in the feed, and also in the filtrate, lines would wear and leak badly after relatively little use, so that they are impractical, and a filtration method, for use with such material, is desired which is not dependent upon such mechanical devices. Such a method is also desired in removing non-volatile components from gasified or vaporized components of coal, to avoid water-washing and subsequent treatment steps, or the less efficient cyclonic recovery method.

It is an object of the present invention to provide a method for the filtration of suspended solids or dusts from gases at high temperatures. It is an additional object of the present invention to provide an efficient and continuous method for the substantially complete filtration of submicronic particles of magnesia and carbon from suspension in a gaseous mixture of magnesium vapor and hydrogen. Still further objects are to provide an efficient method for separating dust from metal vapors, and such method for separating coal particle residues from gasified coal components.

According to the present invention, wherein gas-solids suspensions are filtered through rigid porous filter media, the surface of the filter medium is cleaned periodically during the filtration operation by quickly or suddenly injecting backwashing gas through the filter medium from time to time, or at intervals. The backwashing gas is injected into the filter, that is, directly into the downstream filter zone adjacent the filter under high pressure, in some embodiments preferably under a pressure of at least six times the pressure of the incoming gas-solids suspension and suitably under a pressure of from 6 to 30 times the pressure of the incoming suspension. The backwashing gas is passed through the filter medium for short time intervals preferably as short as it is possible to make them. The backwashing gas can be injected through a nozzle and Venturi tube arrangement without at any time stopping the flow of the gas-solids suspension into the filter apparatus by any external means. It is preferred that the backwashing gas be introduced in a quick, violent surge and for a time not over 1/10 second. The entire backwashing operation can thus be carried out without requiring the use of any mechanical valves in contact with the feed suspension. In other words, the backwashing gas is introduced and directed toward and through the filter medium in a reverse direction, while contemporaneously or simultaneously the gaseous suspension is introduced into the apparatus and is allowed to, or continues to, flow toward the filtration zone or the filter medium surface.

The backwashing gas is introduced in a quick, violent surge whereby the cake of solids deposited on the surface of the filter is ruptured and dislodged. As stated above, the filtered solids deposit in the pores of the filter medium or between the particles thereof forming a bridge across the pores and tending to shut off the forward flow of the gaseous component. Apparently, the introduction of a quick, violent surge of backwashing gas imposes stresses which rupture these bridges of deposited solids and also the filter cake which extends beyond the surface of the filter, thereby cleaning out the pores and dislodging the filter cake. According to the present invention, high instantaneous backwashing gas pressures are applied. This can be accomplished in various ways. For example, a small, sharp explosion on the downstream side of the filter medium sets up a shock wave serving to dislodge the filter cake. This can be effected conveniently in a filter device wherein small charges of air and of an explosively combustible gas are introduced on the downstream side and enabled to react. This manner of operation is useful only where the vapor being filtered is not itself explosive or highly combustible. In another embodiment of the invention, the attached drawing, Figures 1 to 4, shows an apparatus which is excellently suited to the introduction of the backwashing gas in a quick, violent surge and under the desired pressure relationships to effect cleaning of the filter and dislodging of the filter cake. Figure 5 shows another means of applying a sudden surge of backwashing gas.

It is an advantage of the present process that the filter medium or a portion thereof can be cleaned, and the filter cake dislodged, without mechanically stopping or interrupting the forward flow of incoming feed suspension or, in some embodiments, of the filtrate gas or vapor. In an installation where several filter cells are employed, for example, in one filtering zone, one cell can be cleaned at a time by the present method, while the flow of suspension into the zone continues and the filtrate continues to flow through the other filter cells and away from the zone. Likewise, in some embodiments, where only one filter is employed, the violent surge of backwashing gas can effect the desired cleaning while suction continues to be applied, which normally produces the flow of the suspension and filtrate; or alternatively, while pressure continues to be applied to effect this flow. It is a further advantage that gas and vapor suspensions at higher temperatures can be filtered by the present method.

An apparatus according to this invention and one preferred mode of carrying out the method of the present invention will be explained below, with reference to Figures 1 to 4 of the annexed drawings, wherein Figure 1 is a vertical cross-sectional view of a single filter unit, showing the filter housing, the filter casing, the mounting of the filter assembly inside the filter casing and the solids removal screw-conveyor;

Figure 1:
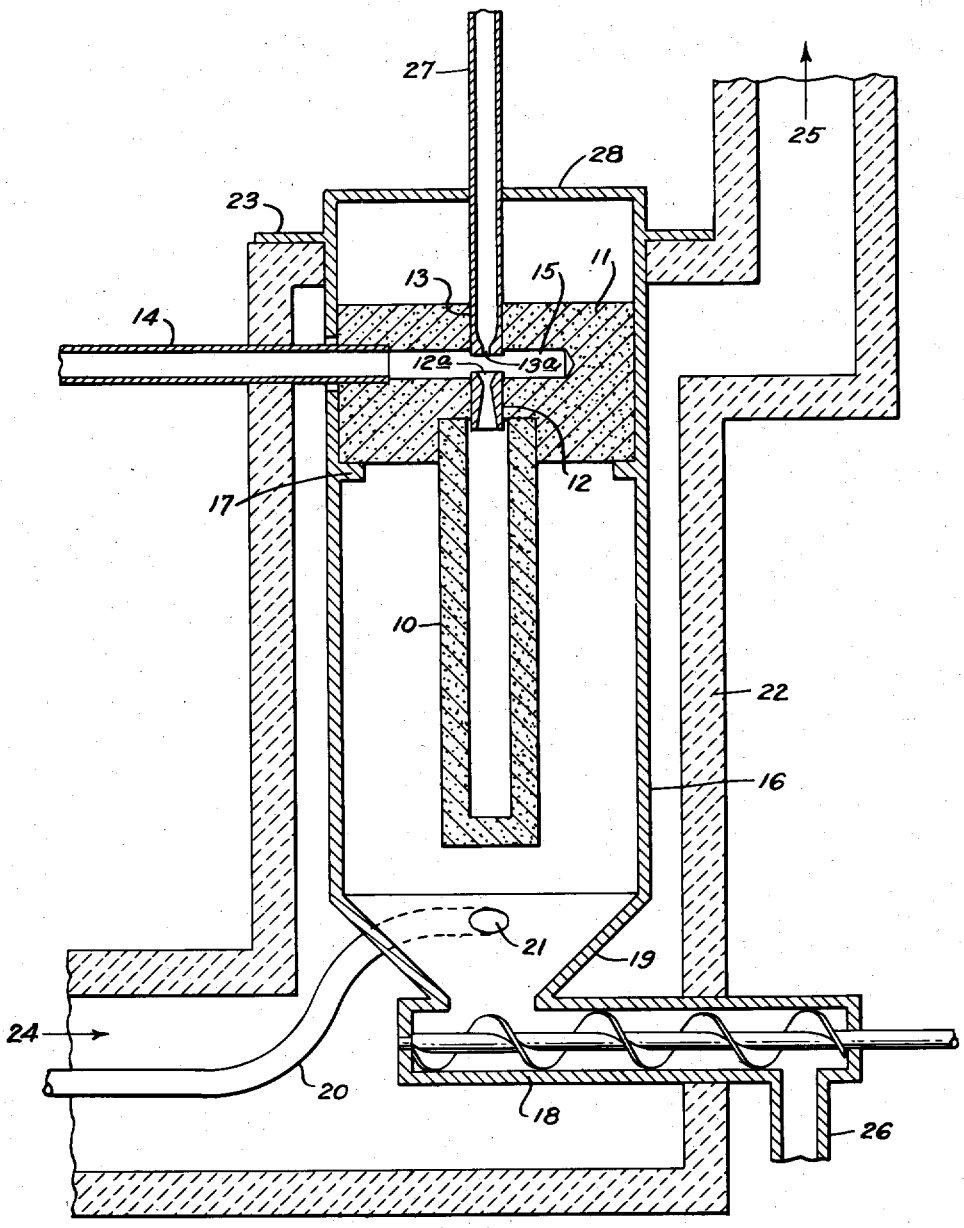

Referring to Figure 1 of the drawings, a porous cylindrical tube 10, closed at the bottom, is centrally threaded and cemented at its open top portion into a channeled, cylindrical supporting block 11. Similarly fastened into supporting block 11 is an ejector nozzle 13, a Venturi tube 12 and an effluent vapor tube 14, all of which are in open communication through channel 15. Tube 10, nozzle 13, and Venturi tube 12 are preferably arranged in coaxial relationship with each other, as shown, and the nozzle 13 and the Venturi tube 12 are threaded or slidably fitted into block 11 so that the gap between them, across channel 15, can be increased or decreased for proper functioning in various applications and under different operating conditions, as will be more fully described later. Nozzle 13 is provided with an inlet tube 27, which may be integral with the nozzle portion or may be a separate tube suitably joined to the nozzle. Nozzle 13 is also provided with constricted outlet 13a which is of smaller internal diameter than outlet 12a of Venturi tube 12.

The supporting block 11 is supported within cylindrical casing 16 by means of an annular shelf 17. Cylindrical casing 16 is tightly closed at the top cover 28, and at the bottom it communicates with screw conveyor 18 through the funnel-shaped open-ended bottom 19. The entire casing 16 is supported centrally within a cylindrical housing 22 by means of an annular shoulder flange 23. Inlet tube 20 communicates with the interior of the lower portion of casing 16 through opening 21; tube 20 being disposed tangentially to bottom 19 at the opening 21 so as to set up a tangential spiral flow of gas in casing 16. Bottom 19 communicates with conveyor 18, which in turn communicates with solids discharge pipe 26. Housing 22 supports and houses casing 16 and serves as an oven when hot gases are introduced through opening 24, passed around casing 16, and withdrawn through opening 25. Housing 22 is preferably of refractory materials and serves as an insulator when the filter is in use.

Figure 2:
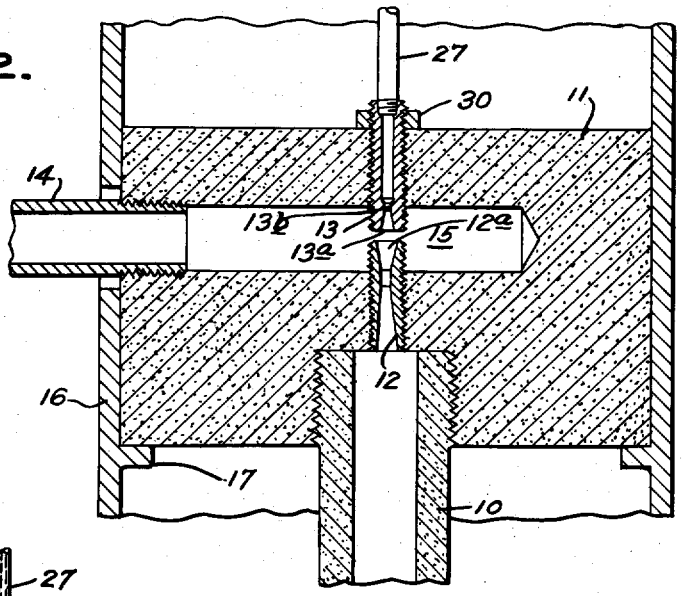
Figure 2 is a detail fragmentary view in vertical cross-section showing a preferred design for the Venturi tube and nozzle combination which is mounted in a supporting block in combination with the filter tube and the vapor outlet tube.

Figure 2 shows in detail different and preferred design of venturi 12 and nozzle 13. Both venturi tube 12 and nozzle 13 are threaded to permit ready adjustment of the space between their respective outlets 12a and 13a. A hardening cement may be used on the threads to hold these parts in fixed position after they are properly adjusted. Outlet 13a of nozzle 13 is flared outwardly from a constricted neck or throat portion 13b. The internal diameter of flared inlet 13a is smaller than that of venturi outlet 12a.

Figure 3:
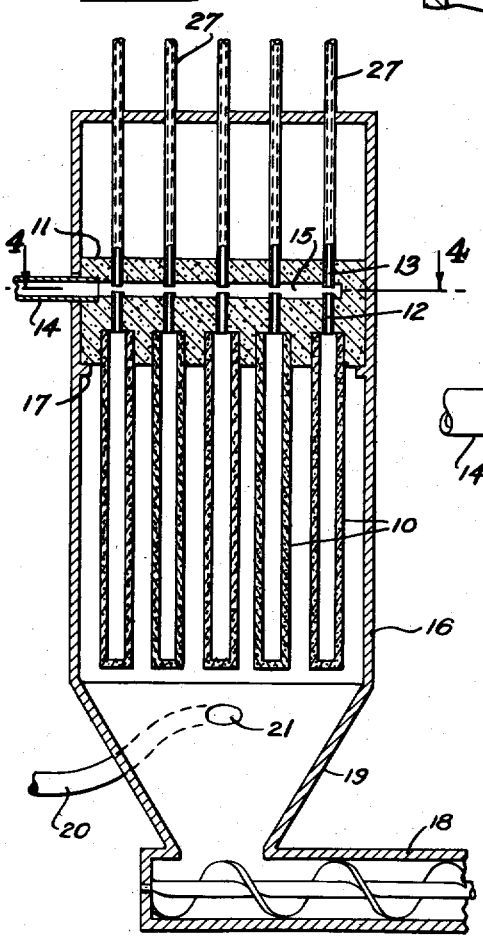
Figure 3 is a vertical cross-sectional view, corresponding to that of Figure 1, but showing a modified apparatus containing a battery of filter units connected in parallel to increase the filter capacity, and to make the operation more fully continuous.
Figure 4:
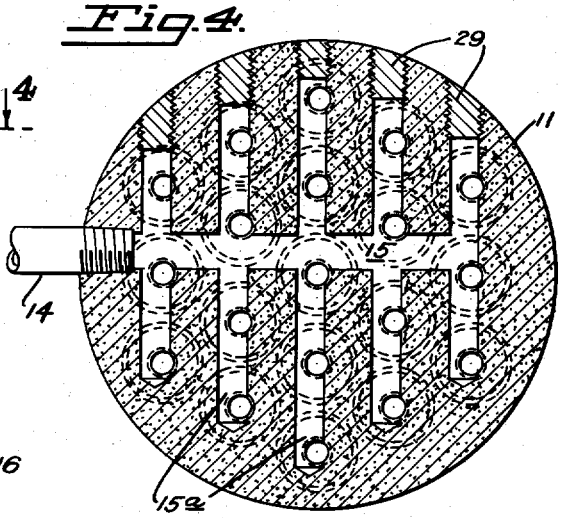
Figure 4 is a cross-sectional view taken on line 4—4 of Figure 3, looking downward, showing the parallel arrangement of the filter tubes and the manifold arrangement of the communicating vapor channels.

Referring to Figures 3 and 4 of the drawings, a plurality of spaced filter tubes 10, each of which is similar to the single filter tube 10 of Figures 1 and 2, are similarly threaded and cemented into supporting block 11. Each of the tubes 10 is provided with a venturi tube 12, and, located above but spaced from each venturi tube 12, is a co-operating nozzle 13. Each of these features is preferably of the same construction as the corresponding features of the apparatus shown in Figure 1 or 2. The several filter tubes 10, venturi tubes 12, and nozzles 13 are in open communication through main channel 15 and side channels 15a. These channels are conveniently formed by drilling holes inward from the sidewall of supporting block 11. The open ends of side channels 15a are plugged by threaded plugs 29, as shown, and outlet tube 14 is threaded into the open end of main channel 15. Supporting block 11 is supported on annular shelf 17, and the entire assembly thus described, including casing 16, is also housed in a suitable housing (not shown) in the same manner as shown in Figure 1.

In operating according to the mode of procedure wherein the devices of Figures 1 to 4 are particularly useful and referring to Figure 1, the gas-solids suspension is introduced through tube 20 into casing 16 at point 21 in a direction tangential to the periphery of funnel section 19 of the casing. By introducing the suspension in this manner at a point below the bottom of tube 10, the suspension is prevented from impinging directly on the tube and some of the larger suspended particles are separated from the suspension by means of centrifugal action. The gas phase of the suspension is forced through the pores or gas passages of tube 10 by maintaining a sufficient pressure differential across its walls. This gas phase or filtrate passes freely through venturi tube 12, channel 15 and out through outlet tube 14 for condensation or whatever other further processing is required. During normal filtering operation, because of the constricted opening 13a in nozzle 13, there is little or no tendency for filtrate to diffuse into nozzle 13.

During filtering, the filtered solids build up and tend to form a filter cake on the outer walls of tube 10 as the gas filtrate passes from the inside of tube 10 through venturi tube 12 into channel 15 and out through tube 14. This filter cake continues to build up on the outer walls of tube 10, and because of its resistance to flow of the gaseous filtrate, if allowed to continue to form, will in time completely block the passage of gas through the filter medium.

To prevent this from happening, the accumulating cake of filtered solids is dislodged and caused to drop to the bottom of casing 16 and into the inlet end of screw conveyor 18, by periodically introducing into tube 10, through nozzle 13 and venturi tube 12, a sharp blast of gas at a pressure appreciably greater than that on the outer wall of tube 10. This is accomplished in this embodiment by passing gas at the required pressure into tube 27. Nozzle 13 and venturi tube 12 are positioned relative to each other so as to direct the gas blast through venturi tube 12 and simultaneously produce a momentary suction on the filtrate stream in tube 14. This effect is achieved by properly adjusting the width of the gap between the bottom of nozzle 13 and the top of venturi tube 12, and by having nozzle outlet 13a of smaller diameter than venturi outlet 12a. The width of this gap across channel 15 will depend upon, among other factors, the design of nozzle 13 and venturi tube 12. In any case, it is preferably adjusted to give a maximum backwash pressure and rate of backwash flow through filter tube 10, in keeping with the strength of the tube. The most efficient backwashing is accomplished by applying the backwashing gas at the highest pressure that the apparatus will safely withstand and for the shortest possible time. For the apparatus described above, the optimum backwash pressure and time were found to be about 100 pounds per square inch gage and about 0.086 second, respectively.

After nozzle 13 and venturi tube 12 are properly adjusted, it is not necessary to shut off mechanically either the stream of suspension being fed to the filter, or the stream of filtrate being withdrawn from the filter during the short backblow period. There is a slight momentary compression of the feed suspension inside casing 16 and inlet tube 20, while the backblow gas is forced into tube 10, and a simultaneous, slight reduction in the pressure of the filtrate stream in tube 14, due to venturi action; but the increase in pressure in tube 20 and the reduction in pressure in tube 14 are both very slight, and of only momentary duration, when the apparatus is properly adjusted as described above. Because only relatively small amounts of backwash gas are used, the progress of the filtration is substantially continuous and relatively high throughflows of filtrate are readily obtained.

The flow of backwashing gas through tube 27, nozzle 13, etc., can be accomplished by means of any of several quick-acting mechanical valves well known in the art, which may be manually operated but are preferably automatically operated by suitable electrical timing equipment also well known in the art.

Referring to Figures 3 and 4, the operation of this embodiment of the invention is substantially the same as described above except that in this embodiment filtration proceeds continuously. Each filter tube 10 is backwashed in rotation for a short period of time without in any way interrupting the filtration taking place in all of the other filter tubes. This is accomplished by virtue of the venturi action described above which avoids a pressure effect in channels 15 and 15a and actually produces a slight suction in aid of filtration through the tubes other than the one being backwashed. The flow of backwashing gas can be accomplished manually or automatically by suitable electrical timing apparatus, as explained above with reference to Figure 1, suitable valves and timing equipment for the purpose being well known in the art.

The following specific example illustrates more clearly a preferred mode of carrying out the method of the invention, wherein the gas-solids suspension is filtered and the filter medium surface is cleaned by a violent surge of backwashing gas, in the apparatus as described above. The gas-solids suspension to be filtered is obtained by vaporizing magnesium metal, in a hydrogen atmosphere, from magnesium carbothermic dust, as described hereinabove. The suspension, comprising about 50% by volume of hydrogen and 50% by volume of magnesium vapor, and a solids phase of about 0.032 pound of suspended solids (containing about 50% carbon and about 50% magnesia by weight) per standard cubic foot of the gas phase, and having particles of average diameter of about 0.2 micron, was filtered in an apparatus of the type described in connection with Figures 3 and 4 above. The filtrate of magnesium vapor and hydrogen produced was substantially free of solids. During the filtration through a battery of nine filter tubes, the gauge pressure of the suspension in the feed line 20 was maintained at about 115 inches of water (about 4 lbs. per sq. in.) and the gauge pressure of the filtrate in line 14 was about 15 inches of water (about 0.5 lb. per sq. in.); thus the pressure differential across the filter was about 100 inches of water (about 3.5 lbs. per sq. in.). The filter tubes used were composed of porous carbon having effective porosities of about 48 percent and average pore diameters of about 140 microns. Their overall diameters and lengths were 4 inches and 32.5 inches, respectively, their internal diameters and wall thicknesses were 2 inches and 1 inch, respectively, and their effective internal volumes were about 0.144 cubic foot. Each filter tube was backwashed once every 114 seconds in rotation, for a period of about 0.1 second by the use of a volume of backblow hydrogen approximately equal to that of the filter tube, and at a pressure of 100 pounds per square inch gauge, or about 115 pounds per square inch, absolute. The backblow hydrogen was introduced into tube 27 through a quick-opening solenoid valve situated outside the filter casing and actuated by periodic electrical impulses from a time switch. The hydrogen backblow gas used contained less than 0.05% oxygen by volume to avoid plugging the inner wall of the tube with a deposit of magnesium oxide. The gap between the top of venturi tube 12 and the bottom of nozzle 13 was about 5/16 inch. The venturi tube had an internal diameter of about 0.60 inch at its inlet and 0.546 inch at its outlet end, which was constricted to about 0.436 inch at the mid-point of the tube, and the nozzle had an internal diameter of ¼ inch which was flared out to 0.40 inch at the tip of the nozzle. During the filtration the filter casing 16 was heated to a temperature of about 1950° F. by passing hot flue gases through the refractory brick housing 22, as previously described.

Figure 5:
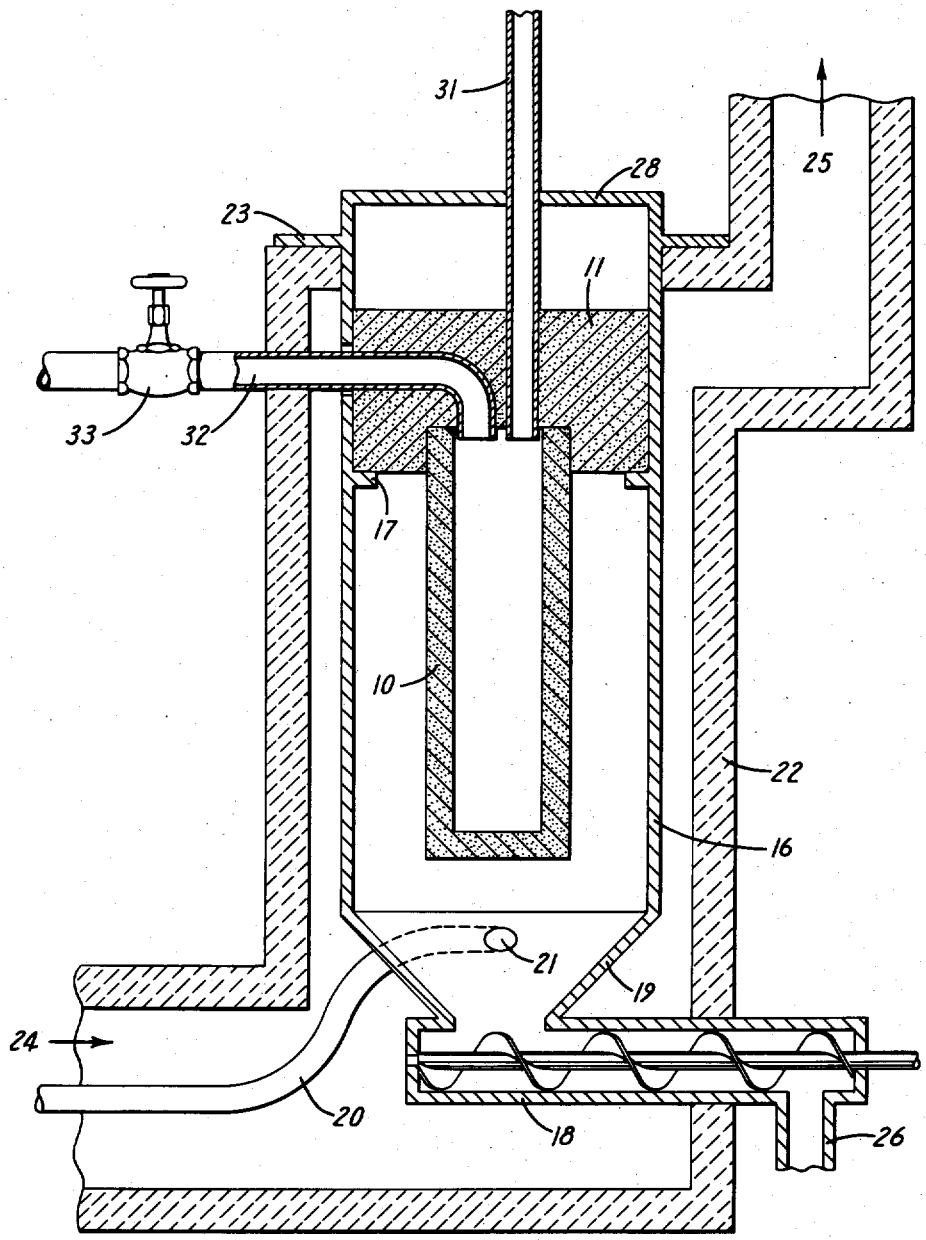
Figure 5 is a vertical cross-sectional view of a further modification.

In an alternative mode of operation, the filtration can be carried out in a device as shown in Figure 5, wherein 10 is the porous, rigid filter cell and other like parts are indicated by the same numerals as in the previous figures. In this embodiment, the blowback gas is introduced through inlet tube 31, controlled by a valve (not shown) which can be operated manually or automatically as described above, and filtrate flows away through conduit 32. Outflow of filtrate is controlled, manually or otherwise, by valve 33, in conduit 32. In operation, valve 33 is closed and blowback gas is rapidly introduced in an amount and under such pressure as to quickly increase the pressure within the filter cell to about 12 times that of the incoming feed suspension, whereby the filter is cleaned. This embodiment is suitable for the filtration of vaporized coal components, or the like. In still another mode of carrying out the invention, the blowback gas pressure is produced by effecting a small explosion within, or on the downstream side of, the filter cell or medium, as for instance by introducing a mixture of small amounts of gases explosively reactive into the downstream space, such as, for example, a mixture of air and light hydrocarbon or of air and hydrogen, which are ignited, for example, by the high temperature of the filtrate zone, or otherwise, if desired. This mode of procedure is operable when the gas phase is not a reactive gas such as magnesium vapor.

Various materials of construction may be used for the different parts of the apparatus, depending upon the chemical reactivity of the components of the suspension being filtered, the temperature of filtration, etc. When the apparatus is used for high temperature filtration, as, for example, in the filtration of suspended magnesia and carbon from magnesium vapor diluted with hydrogen at temperatures of about 1400° F. to 1900° F., filter tube 10 is preferably constructed of porous carbon having an effective porosity of about 48 percent, and an average pore diameter of about 140 microns. Supporting block 11 is preferably constructed of consolidated graphite, nozzle 13 and venturi-shaped tube 12 may be made of mild steel (nickel plated as a protection against carburization), or of graphite, casing 16 and conveyor 18 may be made of stainless steel, and housing 22 is preferably made of a heat-resistant material such as refractory brick.

Although the method and apparatus of the invention have been described in detail as applied to the filtration of suspended finely divided carbon and magnesia from magnesium vapor diluted with hydrogen, they are clearly generally applicable to the filtration of solids from any gas-solids suspensions, particularly at high temperatures, or where either one or both phases of the suspension are corrosive or reactive toward ordinary materials of construction, or where substantially complete removal of solids is necessary; for instance, for the removal of solids from the vapor stream resulting from the gasification of coal wherein finely divided coal is heated in a pebble stove, together with steam and oxygen, at temperature of, preferably, at least 3000° F. (A method of gasification of coal is described in U.S. Bureau of Mines Report of Investigations 4733, issued November, 1950). Residual dust, containing ash or non-combustible material, must be removed from the vapors issuing from the reaction or combustion zone. The method and device of this invention are useful for removal of such dusts. This method and device are also useful for removing very small solid particles from the vapors or gases issuing from a zone wherein finely divided coal, in fluidized state, is heated at not over about 1000° F., preferably from 800° F. to 900° F., to produce finely divided chars and to vaporize off the volatile constituents including tars, pitches and the like.

Among the principal advantages of the method and apparatus of this invention are their usefulness in high temperature filtration operations. The present method and apparatus function at temperatures as high as 2000° F. Furthermore, no moving parts necessitating high repair and maintenance costs, are employed in one embodiment of the apparatus in contact with material likely to clog the moving parts, or to overheat or corrode them. Since the method does not depend upon reduced pressures for its operation, it enables also elimination of the use of expensive vacuum pumps and auxiliary equipment frequently required by prior art methods. The method and device are applicable in separation operations where centrifugal cyclone separators and electrostatic precipitators are found to be unsatisfactory because they do not effect a sufficiently complete separation of suspended solids from the gaseous phase.

The terms "gas" and "gases" as used herein are intended to include vapors as well as gases.

This application is a continuation-in-part of my copending application, Ser. No. 4,996, filed January 29, 1948, and now abandoned.

I claim:

1. An apparatus for filtering solids from gases, comprising a porous filter unit, an outlet conduit for conducting filtered gas away from the filter unit, a venturi conduit interposed between and connecting said outlet conduit with said porous filter unit and a backwashing conduit arranged transversely to said outlet conduit and aligned with but spaced from said venturi conduit, said backwashing conduit also being in open communication with both said outlet and venturi conduits whereby said backwashing conduit is adapted to deliver a surge of gas to and through said venturi conduit and toward the filter unit oppositely to the flow of gas toward the exterior surface of said filter unit during the normal filtering operation.

2. An apparatus of the type defined in claim 1 wherein the porous filter unit is porous carbon.

3. An apparatus for continuously filtering solids from gases, comprising a plurality of porous filter units, means for continuously feeding gas-solids suspensions toward the exteriors of said filter units, a common outlet conduit for conducting filtered gas away from said filter units, a separate venturi conduit interposed between and connecting each filter unit with said common outlet conduit and a separate backwashing conduit arranged transversely to said outlet conduit and aligned with but spaced from each of said venturi conduits, each backwashing conduit also being in open communication with said common outlet conduit and the individual venturi conduit aligned with the said backwashing conduit whereby each backwashing conduit is adapted to independently deliver a surge of gas to and through the venturi conduit aligned therewith and toward a filter unit oppositely to the flow of gas toward the exterior surface of said filter unit during the normal filtering operation.

4. An apparatus of the type defined in claim 3, wherein each of the said venturi conduits is coaxial with its cooperating backwashing conduit, and the outlet opening of said backwashing conduit is of lesser internal diameter than that of its cooperating venturi conduit.

5. An apparatus for filtering solids from gases comprising the combination of a casing having an inlet and an outlet, a supporting block mounted within said casing, said supporting block also being provided with an outlet conduit in open communication with said last mentioned outlet, at least one filter unit suspended from said block, a venturi conduit interposed between and connecting said filter unit with said outlet conduit and a backwashing conduit arranged transversely to said outlet conduit and aligned with but spaced from said venturi conduit and in open communication with said outlet and venturi conduits, whereby said backwashing conduit is adapted to deliver a surge of gas to and through said filter unit oppositely to the flow of gas toward the exterior surface of said filter unit during the normal filtering operation.

6. An apparatus of the type defined in claim 5 wherein means are provided for collecting and removing said solids.

7. An apparatus for filtering solids from gases comprising the combination of a casing having an inlet and an outlet, a supporting block mounted within said casing, said supporting block also being provided with an outlet conduit in open communication with said first mentioned outlet, a plurality of filter units suspended from said block, a separate venturi conduit interposed between and connecting each filter unit with said outlet conduit, a plurality of backwashing conduits each one of which is arranged transversely to said outlet conduit while being aligned with an individual venturi conduit and a filter unit, each backwashing conduit also being in open communication both with said outlet conduit in said block and the individual venturi conduit aligned with said backwashing conduit, whereby each backwashing conduit is adapted to independently deliver a surge of gas to and through the venturi conduit aligned therewith and toward a filter unit oppositely to the flow of gas toward the exterior surface of said filter unit during the normal filtering operation.

8. In an apparatus for filtering solids from suspensions in gases wherein an inlet conduit is provided for introducing the gases to a filter unit and an outlet conduit is provided for withdrawing the filtered gases away from the said unit, the combination of a venturi tube interposed between and connecting said outlet conduit with said filter unit and a backwashing conduit arranged at an angle to said outlet conduit and aligned with and spaced from said venturi tube, said backwashing conduit being at all times in open communication with both said outlet conduit and venturi tube whereby said backwashing conduit is adapted to deliver a surge of backwashing gas to and through said venturi tube and toward the filter unit without seriously disturbing the contemporaneous counter flow of gas toward the outside surface of said filter unit during normal filtering operations.

9. An apparatus for filtering solids from suspensions in gases comprising a filter casing containing an inlet tube and an outlet tube, an axially elongated porous filter cell, said filter cell being closed at one end and having an outlet aperture substantially centrally disposed in the other end and at an angle to said outlet tube, a venturi tube disposed in said outlet aperture in said cell and in open communication with said outlet tube, a backwashing conduit axially aligned with and spaced from said venturi tube, said backwashing conduit being at all times in open communication with said outlet tube and said venturi tube, whereby said backwashing conduit is adapted to deliver surges of gas through said venturi tube and into said filter cell oppositely to the normal flow of gas toward the exterior surface of said filter cell during normal filtering operations.

10. Apparatus of the type defined in claim 9 wherein said porous filter cell is a tube.

11. Apparatus of the type defined in claim 9 wherein said porous filter cell is a carbon tube.

*12. In an apparatus for filtering solids from gaseous suspensions thereof, at least one filter unit defined in part by a permeable filter medium and having an ever-open opening, means for continuously moving gaseous suspensions in a filtering flow through said medium into said filter unit and for continuously moving the filtered gas through said ever-open opening in a normal filtering flow, a mechanism for simultaneously stopping and reversing the flow of filtered gas through said ever-open opening and for cleaning said medium, said mechanism comprising means for abruptly and momentarily releasing a high energy gaseous fluid, said fluid release means also defining a point of directional release of gaseous fluid in a direction opposite the direction of said filtering flow through said opening, means for delivering high energy gaseous fluid to said fluid release means from a source of said fluid, said fluid release means also being so located as to position the point of fluid release adjacent said ever-open opening and at such a distance downstream from said opening that the high energy fluid when released will be injected to and through said opening, extending over the entire cross sectional area of said opening as it passes therethrough, causing a momentary stopping and reversing of filtered gas flow through said opening.*

*13. In an apparatus for filtering solids from gaseous suspensions thereof, at least one filter unit defined in part by a permeable filter medium and having an ever-open opening, means for continuously moving gaseous suspensions in a filtering flow through said medium into said filter unit and for continuously moving the filtered gas through said ever-open opening in a normal filtering flow, a mechanism for simultaneously stopping and reversing the flow of filtered gas through said ever-open opening and for cleaning said medium, said mechanism comprising means for abruptly and momentarily releasing a high energy gaseous fluid, said fluid release means also defining a point of directional release of gaseous fluid in a direction opposite the direction of said filtering flow means for delivering high energy gaseous fluid to said fluid release means from a source of said fluid, and outlet means in the filter unit for said filtered gas, said outlet means being in open communication at all times both with said ever-open opening and with the fluid release means so that the passage of the high energy fluid through said ever-open opening will simultaneously cause a momentary suction of the filtered gas in said outlet means, said fluid release means also being so located with respect to said filter unit and said outlet means as to position the point of fluid release adjacent said ever-open opening and at such a distance downstream from said opening that the high energy fluid when released will extend over the entire cross sectional area of said opening as it passes therethrough.*

*14. In that method of filtering a gaseous fluid in which a normally established flow of said fluid is moved toward and through a permeable filter medium which defines, at least in part, the walls of a chamber having an ever-open opening through which the fluid passes during said flow the improvement of maintaining filter medium permeability during said filtering by momentarily and simulatneously stopping said normal flow through said ever-open opening and reversing the direction of flow of fluid through said filter medium by periodically releasing a burst of high energy gaseous fluid over the cross sectional area of said opening and through said opening to cause on the downstream side of said filter medium an abrupt momentary relative pressure rise.*

*15. In that method of filtering a gaseous fluid in which a normally established flow of said fluid is moved toward and through a permeable filter medium which defines, at least in part, the walls of a chamber having an ever-open opening through which the fluid passes during said flow, the improvement of maintaining filter medium permeability during said filtering by momentarily and simultaneously stopping said normal flow through said ever-open opening and reversing the direction of flow of fluid through said filter medium by periodically releasing a*

*burst of high energy gaseous fluid over the cross sectional area of said opening and through said opening to cause on the downstream side of said filter medium an abrupt momentary relative pressure rise and a short sudden reverse flow of fluid through the said filter medium.*

References Cited in the file of this patent or the original patent

UNITED STATES PATENTS

| | | |
|---|---|---|
| 674,351 | Atkins | May 14, 1901 |
| 836,056 | Staples | Nov. 13, 1906 |
| 926,070 | Matchette | June 22, 1909 |
| 1,127,242 | Hay | Feb. 2, 1915 |
| 2,154,773 | Reed | Apr. 18, 1939 |
| 2,255,519 | Preston | Sept. 9, 1941 |
| 2,391,534 | Yerrick et al. | Dec. 25, 1945 |
| 2,429,751 | Gohr et al. | Oct. 28, 1947 |
| 2,526,651 | Garbo | Oct. 24, 1950 |

FOREIGN PATENTS

| | | |
|---|---|---|
| 279,424 | Germany | Oct. 17, 1914 |
| 344,227 | Great Britain | Mar. 5, 1931 |